March 15, 1938. H. J. NICHOLS 2,111,153
COMMUNICATION SYSTEM
Filed July 21, 1934   2 Sheets-Sheet 1

INVENTOR
Harry J. Nichols
Marechal & Noe
ATTORNEYS

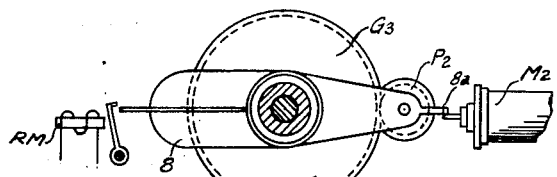
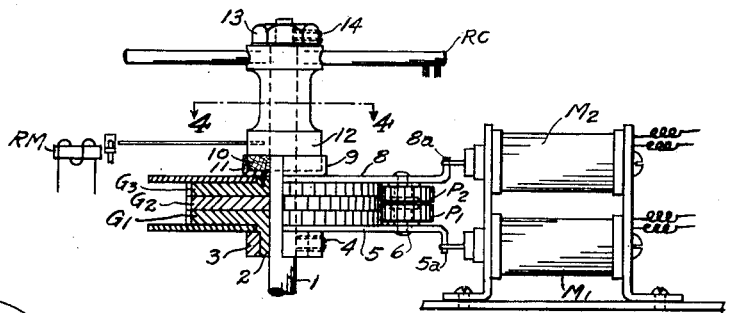
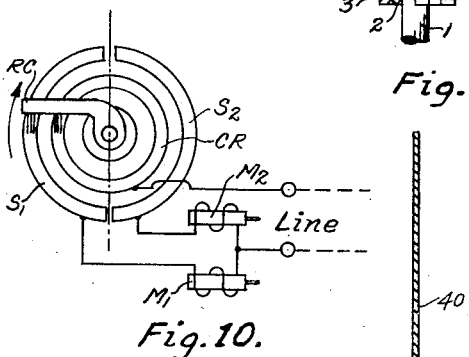
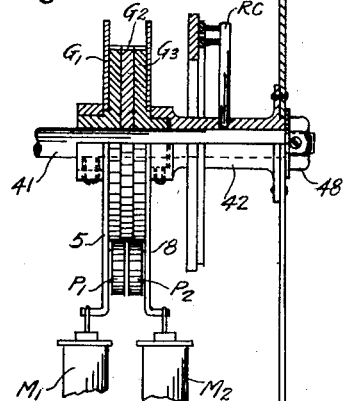
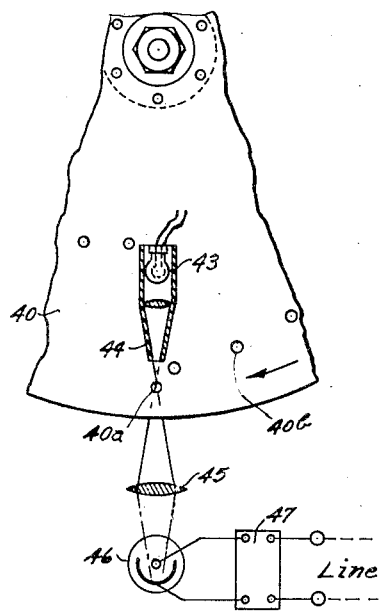

Patented Mar. 15, 1938

2,111,153

UNITED STATES PATENT OFFICE 2,111,153

COMMUNICATION SYSTEM

Harry J. Nichols, Dayton, Ohio, assignor to International Business Machines Corporation, New York, N. Y., a corporation of New York Application July 21, 1934, Serial No. 736,383

4 Claims. (Cl. 178—69.5)

This invention relates to "synchronizing systems" and more particularly to synchronizing systems for remotely controlled communication apparatus.

A general object of the invention is to provide a simple and practical synchronizing system adapted to automatically establish and maintain accurate synchronism of a controlled element at a receiving station with a controlling element at a remotely situated sending station.

A further object is to provide a synchronizing system whereby the receiving machine can be automatically and instantly established in synchronism with the sending machine, and whereby synchronism is automatically reestablished in case the departure from unison exceeds a predetermined amount or degree, or in case communication between the two machines is interrupted.

A further object is to provide a synchronizing method and apparatus whereby the operator at the sending machine can initiate operation of one or more receiving machines, and cause proper conditions of synchronism to be established.

A further object is to provide synchronizing apparatus which is accurate, positive, quiet, and reliable in action, and which is equally adaptable to systems using isochronous driving means and systems in which minor variations in the speeds of the driving means are likely to occur.

A further object is to provide synchronizing apparatus in which the correction of phase variations can be distributed over one or more revolutions of the controlled member, and the energy for which correction is obtained from the driving means.

A further object is to provide a synchronizing mechanism readily adaptable to various types of drive means, for example friction drive means, clutch-coupled drive means, and direct drive means.

A further object is to provide phase corrector means adapted, upon selection, to advance or retard the phase of the controlled member, as may be necessary to maintain unison.

A further object is to provide phase corrector means, and control means therefor, adapted to establish unison between a controlled element and a controlling element from any out of phase position of said controlled element.

A further object is to provide a synchronizing system particularly adapted to the control of remotely situated, visual or record communication apparatus.

Other objects and features will be in part obvious and in part hereinafter pointed out in connection with the following description, the accompanying drawings, and the appended claims.

In many communication systems, such as in television, fac-simile, and printing telegraph systems, wherein images, pictures, and writing are transmitted by electrical means, it is essential that time and phase synchronism be established and maintained between certain elements of the apparatus at the sending and receiving stations. For example, in certain television systems, a rotating scanning disc is utilized to scan the subject at the sending station, and a similar element is utilized at the receiving station to reproduce the subject in the same order of scanning. Likewise in fac-simile systems, a device which includes a rotating cylinder, commonly called the analyzer, is utilized at the sending station to scan the elemental areas of the subject and a corresponding device, commonly called the reproducer, is utilized to reproduce these elemental areas in like order at the receiving station. And in synchronous printing telegraph systems, rotary distributors at the sending and receiving stations are utilized to co-ordinate the transmission and reproduction of the printed characters. It is essential in all such systems, to secure an intelligible reproduction, that the receiving element revolve at the same speed as, and with a definite space phase relation to, the sending element. The method used to establish and maintain the sending and receiving devices at the same speed and proper phase relation is called synchronization. The present invention relates to methods and apparatus for automatic synchronization applicable to systems of various types wherein synchronized rotating sending and receiving elements are used.

In the figures,—

Fig. 3 shows a side view in part section of an epicyclic or planetary phase corrector mechanism in accordance with the invention as applied to a rotary contactor such as is used in synchronous printing telegraph systems.

Fig. 4 shows a plan view in section of the phase corrector mechanism of Fig. 3, the section being taken along line 4—4 of Fig. 3.

Fig. 9 shows in diagrammatic form means of generating periodic synchronizing signals particularly adapted to the sending end of a television system.

Fig. 10 shows in diagrammatic form the synchronizing control circuits at the receiving end of a television system, illustrating another method of utilizing periodic synchronizing signals in accordance with the invention.

Fig. 11 shows an adaptation of the planetary phase corrector mechanism of Figs. 3 and 7 as applied to the synchronization of a television receiving scanning disc.

In the various figures, like characters designate like parts.

The synchronizing system of the invention comprises in general methods for automatically establishing and maintaining time and phase synchronism between remotely situated rotating elements, and a novel planetary phase corrector mechanism suitable to these methods and characterizing the system. The general method consists at the sending end in generating and transmitting periodic signal impulses relating to a particular phase position of a rotary controlling element, and at the receiving end, in receiving and utilizing these signal impulses to automatically establish synchronism of the rotary controlled element, and thereafter utilizing the periodic impulses to correct, when necessary, the phase position of the controlled element, thereby to maintain the controlled element in time and phase synchronism with the controlling element. Various means will be shown and described for generating and utilizing the periodic synchronizing impulses to establish and maintain synchronism, and the planetary phase corrector mechanism will be shown and described in various embodiments illustrative of its application to typical printing telegraph, facsimiles, and television systems.

Figure 1:
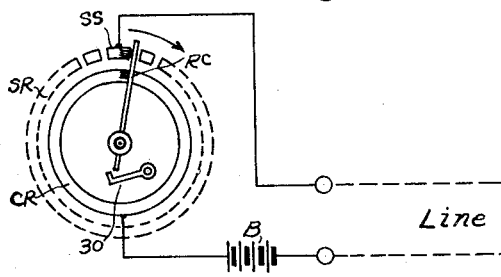
Fig. 1 shows in diagrammatic form a sending rotary distributor of a typical printing telegraph system, illustrating one means of generating periodic synchronizing signals.

Referring now to the drawings which show preferred embodiments of the invention, Fig. 1 shows in diagrammatic form a typical rotary distributor used for sending synchronizing and printing signal impulses in a synchronous printing telegraph system. The distributor includes a rotary contactor RC comprising the controlling element in the system, and sweeping at uniform speed over the face of stationary commutator consisting of a segmented ring SR, comprising a plurality of separate insulated segments and a common ring CR. A particular segment, called the synchronizing segment and designated by SS, sends a synchronizing signal to the line once for every rotation of contactor RC as follows:

One side of local battery B is connected to one line terminal, the other to the common ring CR; the other line terminal is connected to segment SS. Hence every time contactor RC passes over SS, a signal of definite duration and of predetermined time relation is generated and sent to the line. The remaining segments are used to transmit printing signals and for other purposes, but the present invention is not concerned with the printing functions of the apparatus, hence they will not be described.

The synchronizing signals from the sending or controlling station are transmitted to the receiving station over any desired communication channel, such as a wire, or radio system, shown for simplicity as a two-wire line.

Figure 2:
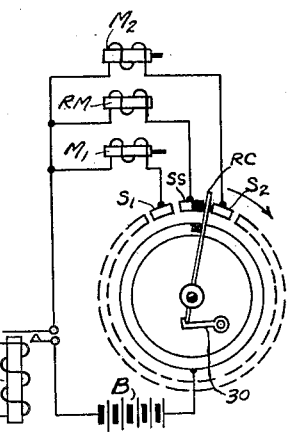
Fig. 2 shows in similar manner the synchronizing control circuits at the receiving rotary distributor of a typical printing telegraph system illustrating one method of utilizing periodic synchronizing signals to produce synchronism.

Referring now to Fig. 2, the synchronizing signals when received are applied to a suitable receiving instrument, such as line relay R, of quick-acting, quick-release type. The contacts of relay R are in circuit with a local current source such as battery B, so that local current pulses corresponding to the received signals are produced in the local circuits by the closing and opening of the contacts of R. One side of battery B is connected to the contacts of R and thence to a bus from which multiple circuits connect various items of apparatus to the respective segments of ring SR. The circuit connected to the synchronizing segment SS includes the winding of release magnet RM, of quick-acting, slow-release, pulse-sustained type, adapted to release rotary contactor RC when energized. For illustrative purposes, the release member 30 actuated by RM is shown in engagement with RC. A relay or magnet suitable for use as a release magnet is described in detail in my copending application, Serial No. 672,161, filed May 22, 1933. On either side of the synchronizing segment are located corrector segments designated by S1 and S2, having corrector magnets M1 and M2 connected in series therewith as shown.

The operation of the apparatus just described is as follows: Contactor RC, which comprises the controlled element of the system, is assumed to be frictionally driven and is initially held at rest on the synchronizing segment SS by release magnet RM. When the first synchronizing signal is received, line relay R closes its contacts producing a local current pulse; thus RM is energized, releasing RC which is quickly put in rotation by its friction drive. Owing to the slight delay in starting, RC lags slightly and at the instant when the second synchronizing pulse occurs it may be assumed to be in contact with segment S1, passing on into contact with SS during the latter part of the local current pulse. M1 is thus energized, causing RC to be advanced in phase by phase corrector means presently to be described. RM is reenergized and sustained by the latter part of the local current pulse, hence remains operated and does not interfere with the rotation of RC. On successive synchronizing signals, RC is advanced by the phase corrector until the entire synchronizing pulse is received on SS, thus establishing perfect synchronism or unison, in which condition the energy of the synchronizing pulse goes entirely to sustain RM.

Thereafter, should RC contact with S1 during the occurrence of the synchronizing pulse, M1 is energized and the phase of RC is advanced to restore unison; should RC contact with S2, M2 is energized and the phase of RC is retarded to restore unison. Thus synchronism is maintained by correcting, when necessary, the phase of RC, without altering the speed of the driving means at either sending or receiving stations. Since the synchronizing signals are transmitted over the same system as the printing signals, all signals are subject to the same retardation, and practical unison of the printing signals is assured by maintaining unison through the medium of the synchronizing signals.

Summarizing, the method of synchronizing illustrated by Figs. 1 and 2 consists of the steps of generating and transmitting single periodic signals indicative of a particular phase position of the controlling member; receiving and utilizing the synchronizing signals at the receiving station to establish synchronism of a controlled member with the controlling member; and thereafter utilizing the synchronizing signals to correct, when necessary, the phase of the controlled member to maintain phase synchronism or unison.

Referring now to Figs. 3 and 4 which show in detail the planetary phase corrector mechanism forming part of the invention, drive shaft 1 carries three gears, preferably of the same pitch diameter, mounted thereon side by side. Drive gear G1 is securely fastened to drive shaft 1, while intermediate gear G2 and driven gear G3 are loose thereon. Drive gear G1 is provided with a hub 2 on which is rotatably mounted epicyclic train arm 5. Collar 3, which maintains arm 5 in place, encircles hub 2 abutting against a shoulder thereon, and is secured in position by a set screw 4 which extends through hub 2 and bears against drive shaft 1. Gear G3 is provided with a short hub on which is rotatably mounted epicyclic arm 8. A friction cup 9, containing a friction washer 10 of fibrous material, is mounted upon the hub of G3, being held against rotation relative to G3 by pin 11. The driven part, as for example hub 12 upon which rotary contactor RC is mounted, is rotatable on drive shaft 1, being driven by the friction washer 10. A tensioning nut 13, screwed on the threaded end of drive shaft 1, holds the assembly in position on the drive shaft and provides a means for adjusting the frictional force. A set screw 14 locks nut 13 in the position to which adjusted.

Pinion gear P1, called the first pinion, is rotatably mounted on arm 5 by any suitable means, such as shoulder rivet 6, so as to mesh properly with G1 and the lower part of G2. In like manner pinion gear P2, called the second pinion, is rotatably mounted on arm 8 so as to mesh properly with G3 and the upper part of G2, there being a slight clearance space between the two pinions.

Arm 5 is provided with a stop member or finger 5a, while arm 8 is provided with a like member 8a. Corrector magnet M1, of any suitable design, has a plunger positioned to intercept finger 5a when extended and to release same when retracted. Likewise corrector magnet M2 has a plunger adapted to intercept and release finger 8a.

Gears G1 and G3 preferably have the same number of teeth, and the same pitch diameter. Gear G2 preferably has the same pitch diameter as gears G1 and G3, but is provided with a different number of teeth, say one more or one less tooth. For example, let G1 and G3 have 120 teeth while G2 has 121 teeth. Pinions P1 and P2 preferably have the same number of teeth, say 30, although this is immaterial. In such a gear system, the angular lead or lag per revolution of the driven gear relative to the drive gear is equal to $$\frac{360° \times n}{N \pm n}$$

where N is the number of teeth in the drive gear and n is the number of teeth more or less of the driven gear as compared to the drive gear. Therefore, in the example chosen, the lag of G2 as compared with G1 is equal to $$\frac{360° \times 1}{120+1} = 3°$$

approximately, while the lead of G3 as compared to G2 is equal to $$\frac{360° \times 1}{121-1} = 3°$$

The speed ratios of the drive and driven gears of the gear train in the example, or any other arrangement of gears of similar nature, may be calculated by the general formula:—The speed of the final gear is equal to the speed of the first gear times the product of the teeth of all the drive gears divided by the product of the teeth of all the driven gears.

The operation of the phase corrector mechanism is as follows: Assume that drive shaft 1 is in rotation while arms 5 and 8 are held against rotation by M1 and M2 respectively. Then for each revolution of the drive shaft, gear G1 progresses 120 teeth, and since pinion P1 meshes with both G1 and G2, G2 will likewise progress 120 teeth. Also since pinion P2 meshes with G2 and G3, G3 will progress 120 teeth; therefore the driven member will rotate at the same speed as the drive shaft.

Now assume that with the drive shaft still in rotation, magnet M1 is energized, releasing arm 5. Then arm 5 is set in rotation with G1 and G2, while pinion P1 ceases rotation, in effect locking G1 and G2 together, thus preventing any relative motion between them. During this revolution, G2 progresses 121 teeth and since P2 meshes with G2 and G3, G3 likewise progresses 121 teeth. This represents a gain of one tooth pitch for G3, or a phase angle advance of 3 degrees. The arm 5 may also be stopped at a fractional part of the revolution to obtain a lesser phase angle change. Hence the driven member advances a like amount in phase with respect to the drive shaft. Assuming that at the end of the revolution, arm 5 is intercepted by M1 and stopped, the driven member resumes rotation at the same speed as the drive shaft as before.

Next assume that M2 is energized, releasing arm 8, thus locking G2 and G3 together. At the end of one revolution, G2 lags G1 by one tooth pitch of G2 and hence the driven member has been retarded in phase angle with respect to the drive shaft by an amount of approximately 3 degrees.

It is thus seen that by releasing arm 5, the driven member is caused to gain or advance in phase, and by releasing arm 8, the driven member is caused to lose or lag in phase. M1 and M2 are thus, in effect, triggers which select the direction in which the phase correction is to be applied. The change in phase is quite gradual, and the application of the driving force between the drive shaft and driven member is continuous during the process of phase correction, the energy for the correction being obtained from the driving means. The change in phase of the driven member per revolution of the drive shaft is independent of the speed of the drive shaft and is entirely a matter of the gear arrangement used, a greater or less phase change being readily obtainable by proper selection of the gear train. The change in phase resulting from each corrective action may also be varied by arranging for the released member to be stopped after a fractional part of a revolution.

Since the phase correcting process is a matter of relative motion between arm 5 and arm 8, another way to obtain correction is to permit arms 5 and 8 to revolve freely as a normal condition, and retard or stop one arm or the other when correction is desired. Such a method of phase correction is quite feasible and clearly within the scope of the invention, the method here described being preferred mainly because of simplicity as regards the operation of the corrector magnets.

In applications where phase correction in one direction only is required, i. e. the phase is either to be advanced or retarded but not both, the gear arrangement may be further simplified. For example, in facsimile systems, it is sometimes preferred to use stop-start unison control whereby the receiving drum is arranged to rotate slightly faster than the sending drum, and at the end of each revolution the receiving drum is detained momentarily until released in response to a synchronizing signal. It will be apparent that a selective differential speed increment in one direction may be obtained by a drive gear, a driven gear, and an epicyclic arm carrying a pinion meshing with both gears, all as herein disclosed. Thus no change in the speed of the drive source is involved and the machine is adapted to be readily changed from sending to receiving condition.

It is to be noted that the two gears and one pinion constitute a differential spur gear, while the three gears and two pinions constitute a compound differential spur gear. When an epicyclic arm is held, its pinion functions in the differential gear train to effect differential driving relation of its two associated gears, but when released it functions as a planetary clutch. The system as a whole may be termed a planetary transmission.

It is to be understood that wide variations in the arrangement and form of the gears, the gear ratios, the construction of the epicyclic arms, and the means for controlling the release and stopping of the epicyclic arms may be found convenient in adapting the invention to various synchronizing systems, and such variations will readily be perceived by those skilled in the art and are within the scope of the invention.

Figure 5:
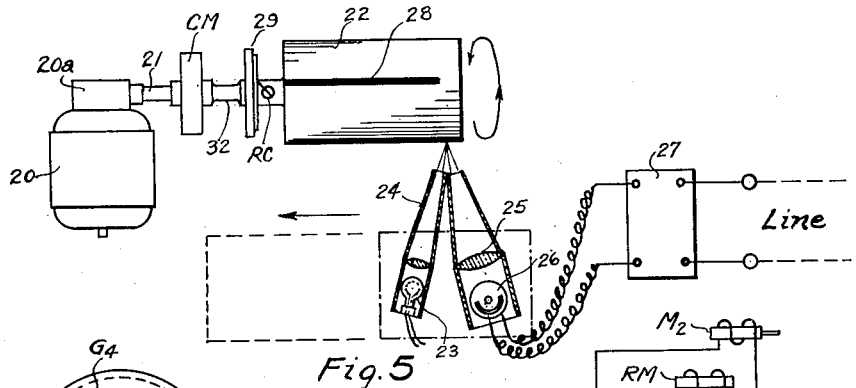
Fig. 5 shows another embodiment of the invention as applied to the sending end of a facsimile system.

Referring now to Fig. 5 which shows in diagrammatic form the elements of the synchronizing apparatus in accordance with the invention applied to a typical facsimile system, drive motor 20 is provided with a reduction gear-box 20a whereby the speed of drive shaft 21 is suitably reduced to drive rotary cylinder 22 at a lesser speed than the drive motor, as is usually found to be desirable. The subject matter to be analyzed is mounted on rotary cylinder 22. There are various known means for translating the light values of the subject matter into electrical variations. One form of translating means commonly used is shown. A beam of light from a light source 23 is focused by optical means indicated by 24 upon a spot on the surface of the subject matter. A collector lens 25 collects the light reflected from the surface of the subject and focuses same upon a photo-cell 26. By causing the translating apparatus to be moved in translation, as indicated, it is evident that the combined rotary and translation movements will cause the light spot to pass progressively over the curved surface of the cylinder, and thus the elemental areas of the subject matter will be scanned. The current passing through a photo-cell is proportional to the amount of light which it receives, hence the current therethrough varies with the amount of light reflected from the surface of the subject matter. These current variations are amplified by a suitable amplifier, indicated by 27, and are then transmitted over a communication channel, shown as a transmission line, to the receiving station.

Because of the high degree of amplification required to increase the amplitude of the current variations in the photo-cell to values adequate for transmission, it is preferable in facsimile transmission apparatus to avoid the use of circuit interrupting devices such as commutators and breaker contacts. Hence it is preferred that motor 20 be of non-commutating type, preferably a synchronous motor. For the same reason, while any suitable means may be used, I prefer to generate the periodic synchronizing impulses by non-commutating means, and to that end employ means including the rotary cylinder 22 and the translating device of the facsimile apparatus.

A strip or stripe 28, of suitable width, is placed over or on the subject matter mounted on the cylinder, the reflecting properties of the strip preferably representing one of the extremes of light value, such as black or white. The strip is mounted out of the field of the subject matter, the preferred arrangement being a narrow black strip, somewhat shorter than the cylinder, clamped along the length of the cylinder and serving also to hold the overlapping edges of the sheet containing the subject matter securely in place.

The synchronizing signals are generated as follows: The rotary cylinder 22 is put in rotation, and the translating device is brought into position at the margin of the field of the subject matter and the translating apparatus rendered operative. Thereafter, during the sending operation, a signal of definite duration is generated each time strip 28 passes beneath the light spot by reason of the current variation produced in the photo-cell, which current variation, after amplification, is transmitted to the receiving station. This signal, transmitted for every revolution of cylinder 22, constitutes the synchronizing signal.

It is assumed that duplicate mechanism is provided at the sending and receiving stations. When receiving, the received synchronizing signals are utilized to establish and maintain synchronism as follows: Between the motor drive shaft 21 and cylinder 22 is interposed a planetary phase corrector and clutch mechanism, designated by CM, to be described in connection with Figs. 7 and 8. On the hub of cylinder 22 adjacent the planetary mechanism is mounted a rotary contactor RC, sweeping over the stationary commutator 29 consisting of a common ring CR, and a segmented ring SR, shown diagrammatically in Fig. 6. SR has four segments, namely a synchronizing segment SS, two corrector segments S1 and S2 adjacent thereto, and a ring segment RS occupying the remainder of the circumference. The synchronizing segment SS is preferably of the same angular width as the strip generating the synchronizing signal. Corrector magnets M1 and M2 are connected respectively to segments S1 and S2, and the segment RS is connected to RP representing the facsimile reproducing device, which however, does not form a part of the present invention and need not be described. Relay R receives the synchronizing and picture signals and is of suitable construction to translate same into local impulses of the proper characteristics as described in connection with Fig. 2.

Figure 8:
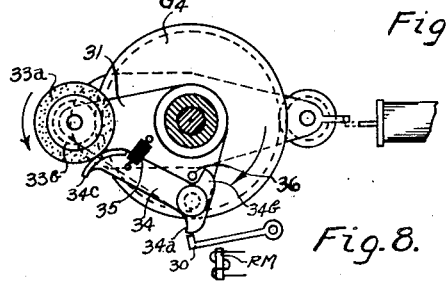
Fig. 8 shows a plan view in section of the mechanism of Fig. 7 the section being taken along line 8—8 of Fig. 7.
Figure 7:
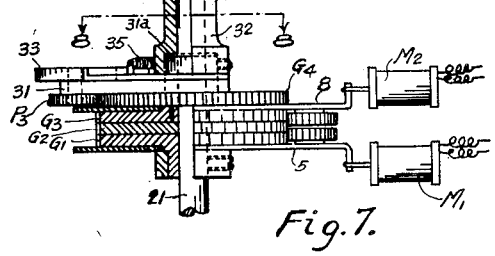
Fig. 7 shows a view similar to that of Fig. 3 illustrating an embodiment of the invention as applied to the facsimile system of Fig. 5.

Referring now to Figs. 7 and 8, which show in detail the mechanism designated by CM in Fig. 5, the planetary phase corrector, gears G1, G2 and G3 and magnets M1 and M2 are similar to those shown in Figs. 3 and 4 and do not require detailed description. Rotatably mounted on drive shaft 21 adjacent gear G3 and fast thereto is gear G4 forming part of the epicyclic clutch mechanism. Rotatably mounted on shaft 21 next to gear G4 is bell crank 31 having a center boss 31a upon which a hub 32 is mounted and adjustably fixed as to rotation by suitable means, such as a set screw. Hub 32, upon which cylinder 22 is mounted, is rotatable with respect to drive shaft 21 and is restrained from axial movement by a nut (not shown) on the outer end of drive shaft 21. Contactor arm RC extends radially from hub 32, and sweeps over the face of stationary commutator 29. Bell crank 31 carries on one arm pinion P3, rotatably mounted thereon, having a coupling wheel 33 fast on its shaft. Coupling wheel 33 has a metal core 33b and a resilient rim 33a, preferably of firm rubber, securely attached to the core. Mounted pivotally on the other arm of bell crank 31 is the coupling member or pawl 34, provided with arcuate end piece 34c lightly serrated on the exterior surface, and held in engagement with coupling wheel 33 by tractile spring 35. Pawl 34 is also provided with a toe piece 34a extending radially and adapted to be engaged by armature 30 of release magnet RM, or suitable intermediary mechanism. The outward movement of pawl 34 is limited by heel piece 34b striking against stop pin 36.

Figure 6:
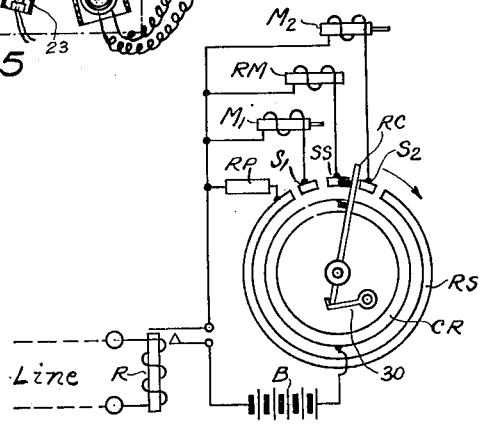
Fig. 6 shows in diagrammatic form the invention applied to the receiving end of a facsimile system.

The operation of the epicyclic clutch mechanism is as follows: Refer to Figs. 7 and 8 and assume that release magnet RM is not energized, hence armature 30 is in a position to intercept toe piece 34a. When toe piece 34a strikes armature 30, pawl 34 is forced out of engagement with coupling wheel 33. The light friction on hub 32 due to the rotation of drive shaft 21 suffices to keep pawl 34 out of engagement with coupling wheel 33, leaving pinion P3 free to rotate. Further motion of bell crank 31 is thus arrested, and hub 32 remains stationary with contactor RC in contact with the synchronizing segment SS of the stationary commutator as illustrated in Fig. 6.

Now assume that armature 30 is withdrawn by reason of a synchronizing pulse energizing RM, thus releasing toe piece 34a; then tractile spring 35 snaps pawl 34 into engagement with coupling wheel 33. Coupling wheel 33 being in rotation counter-clockwise as indicated in Fig. 8, tends to carry end piece 34c along with it, this tendency being aided by the serrated surface. The sum of the radius of the coupling wheel 33 and that of the arc of motion of end piece 34c being greater than the center distance between the pivots of these parts, the resilient rim 33b is increasingly compressed, and the rotation of coupling wheel 33 quickly checked, coupling the parts together, and setting hub 32 and drum 22 into rotation. The coupling action is rapid and positive, slipping being negligible, being equivalent to that of a pawl with a ratchet wheel with an infinite number of teeth. The coupling is accomplished practically without shock and noise.

The method of establishing and maintaining synchronism is as follows:

At the sending end, as shown in Fig. 5, the analyzing device is placed in position at the outer end of the drum 22 so that the scanning spot shines on the drum beyond the end of the synchronizing strip 28. Motor 20 being started, a local control circuit (not shown) is closed, energizing release magnet RM, and holding same in operated condition. The epicyclic clutch is thus released, setting drum 22 into rotation, and starting the traverse of the analyzing device. When the scanning spot reaches the end of strip 28, synchronizing signals are sent to the line.

At the receiving station, in the absence of synchronizing signals, release magnet RM is unenergized, hub 32 is uncoupled from the drive shaft, drum 22 is stationary, and contactor RC is held at rest on the synchronizing segment as indicated in Fig. 6. When the first synchronizing signal is received, RM is energized, releasing the epicyclic clutch arm as previously described, setting drum 22 in motion. A slight delay occurs in energizing RM and in the clutching operation, hence at the end of the first revolution of the receiving apparatus, it may be assumed that contactor RC is in contact with corrector segment S1 when the synchronizing pulse occurs. Corrector magnet M1 is thus energized, releasing arm 8, and advancing the phase of contactor RC. These phase corrections are repeated until perfect unison results, thus establishing synchronism. Thereafter, unison is maintained by the operation of the planetary phase corrector when required as described in connection with Figs. 3 and 4.

It is to be observed that the printing pulses utilized by the reproducer device pass via the ring segment of the commutator (see Fig. 6) hence the synchronizing signals do not reach the reproducer device, nor do the printing signals reach the release or corrector magnets, and hence there is no interference between synchronizing and printing operations.

To summarize, the method of establishing and maintaining synchronism in the facsimile system embodiment of the invention is the same as in the printing telegraph system embodiment. In the facsimile system embodiment, an epicyclic clutch mechanism is shown in preference to the friction drive of the printing telegraph system mainly because, as a rule, the drum of the facsimile apparatus will be heavier than the rotary contactor of the printing telegraph apparatus, and hence requires more force in starting. It is to be understood, however, that the use of a clutch mechanism is a matter of preference, and under suitable conditions, a friction or other suitable drive may be used in conjunction with the planetary phase corrector in facsimile systems.

In television systems, as in facsimile systems, where photo-cell pick-up and amplifiers are used, it is usually preferable to avoid use of contactors in generating signal impulses. Fig. 9 shows a method of generating synchronizing impulses using a photo-cell pick-up. A source of light 43 is positioned so as to concentrate a beam of light on a scanning disc 40, having a synchronizing aperture 40a positioned out of the field of the picture scanning apertures 40b. A condenser lens 45 concentrates the beam of light, after passing through the aperture of the scanning member, upon a photo-cell 46, the current from which is amplified by amplifier 47 before passing to the outgoing transmission system.

Assuming the scanning member 40 to be in uniform rotation, a synchronizing signal is generated and transmitted once for each rotation of the scanning member, and at a particular phase position of the scanning member, in the manner described in connection with Fig. 5.

Referring to Fig. 10, at the receiving station the incoming synchronizing signals, after suitable amplification, are applied to a local circuit, one side of which is connected to common ring CR of a stationary commutator. The other side of the local circuit branches into two parallel circuits, one branch circuit passing through the winding of corrector magnet M1 to a half-ring segment S1 occupying almost 180° of arc on the stationary commutator. The other branch circuit passes through the winding of corrector magnet M2, and thence to half-ring segment S2. A rotary contactor RC (mounted on the hub of the scanning disc of Fig. 11) sweeps over the face of the stationary commutator as indicated.

The scanning element of a television receiver, whether in the form of a disc, drum, belt, or mirror wheel, rotates at high speed, and is likely to have a sizeable amount of rotational energy. Hence it is preferred to arrange for the receiving scanning element to rotate continuously, and gradually establish synchronism by bringing the scanning element from any out of phase position into unison, and thereafter make gradual phase corrections to maintain synchronism. Fig. 11 in connection with Fig. 10 shows the arrangement by which synchronization according to the invention is obtained.

The phase correcting mechanism comprises gears G1, G2, and G3, arms 5 and 8, pinions P1 and P2, and corrector magnets M1 and M2, the structure being identical with that described in connection with Figs. 3 and 4. A hub 42 is mounted securely on the hub of gear G3 by suitable means such as a set screw, but is rotatable upon drive shaft 41. The scanning device, such as scanning disc 40, is mounted securely on hub 42 by suitable means. A nut 48 on the end of drive shaft 41 holds the assembly in position. Rotary contactor RC is also mounted on hub 42, and sweeps over the face of the stationary commutator shown in Fig. 10.

The operation of the apparatus shown in Figs. 10 and 11 is as follows:

Assume that drive shaft 41 is in rotation at the speed of the drive shaft of the sending scanning disc shown in Fig. 9. Then for each revolution of the sending scanning disc, a synchronizing signal is transmitted, and upon reception at the receiving station, is amplified and applied to the local circuit shown in Fig. 10. It may also be assumed that picture signals are transmitted aperiodically between the periodic synchronizing signals. The picture signals are, however, separated from the synchronizing signals by filters or other known means, so that only the periodic synchronizing signals are effective to operate the corrector magnets and relay of Fig. 10. Assume that the first synchronizing signal is received when the rotary contactor is in contact with half-ring segment S1. Corrector magnet M1 is therefore energized, releasing epicyclic arm 5, and as described in connection with Figs. 3 and 4, causes the phase of the scanning disc to be advanced a predetermined amount, say 3 degrees. On subsequent signals, a like advance in phase occurs each time M1 is energized until rotary contactor RC is advanced until it contacts the section of insulation between segments S1 and S2 (shown at the top of Fig. 10), simultaneously with the occurrence of the synchronizing signals. This is the unison point, and so long as contactor RC contacts the unison point simultaneously with the arrival of synchronizing impulses no phase correction occurs.

Next assume that contactor RC is in contact with segment S2 when the first synchronizing signal occurs. Then corrector magnet M2 will be energized, and by means of a series of phase corrections on successive synchronizing signals, contactor RC will be retarded until it reaches the unison point. Thereafter, phase corrections will only occur when RC shifts from unison and contacts either S1 or S2; thus the phase of RC is corrected as necessary to maintain unison. The insulation between the corrector segments S1 and S2 opposite the unison point is held to a minimum, making it impossible for unison to be established at the wrong point.

It is to be observed that in the method disclosed for establishing synchronism of the television scanning device, the receiving rotary element is brought into unison from any out of phase position with the least number of corrective steps possible under the circumstances. Assuming a 3° phase correction per revolution, 60 revolutions would be required to establish unison from the extreme out of phase position. Since the usual speed for scanning devices is 20 revolutions per second it follows that synchronism can be established in three seconds or less, with this particular phase correction.

It will be evident from the foregoing that the system disclosed provides great flexibility in application and operation. For example, in the printing telegraph and facsimile application, the receiving machine or machines may be left running in ready condition, and when the sending machine starts sending synchronizing signals, the receiving machines will be automatically placed in synchronism. Or, the sending machine may be run continuously, sending out synchronizing signals, and the receiving machines started up at will and brought into synchronism automatically without stopping the sending machine. In applications requiring two way operation, the direction of transmission may be quickly reversed without adjustment of the speed of either the sending or receiving machine, and without adjustments to compensate for line or instrumental delays. Since the synchronizing signals are only required to operate a trigger device, such as a corrector magnet, the energy for actual correction being obtained from the drive means, relatively weak synchronizing signals may be utilized. The synchronizing signals may be of the same order as the operating signals, and may be sent over the same channel as the operating signals. Likewise, the synchronizing signals are of suitable character to permit transmission over any ordinary communication system. This is a point of practical importance in many applications, particularly where radio communication channels are involved.

The system is equally applicable to machines having a common synchronous or independent power supply. Alternating current or direct current motors of uniform or substantially similar speed characteristics may be used as the drive means. When synchronous motors supplied from a common power source are used, the synchronizing apparatus functions to establish unison, and the synchronous power from the common power source thereafter maintains synchronism.

since under normal conditions the drive motors will continue in synchronism indefinitely.

When drive motors are used that do not operate in accurate isochronism, as non-synchronous alternating current or direct current or other types of motors running at speeds relatively close to each other or substantially isochronously, the synchronizing apparatus functions to establish and thereafter maintain synchronism compensating in the necessary manner for differences, either constant or variable, in the respective speeds. Furthermore, synchronization may also be accomplished where one motor operates at a multiple or sub-multiple speed with respect to the other.

In event communication or the supply of power is interrupted, or a departure from unison occurs, the synchronizing apparatus functions to automatically re-establish synchronism.

Since the drive shafts at the sending and receiving machines run at the same speed when sending and receiving, and the phase corrector mechanism does not affect the speed of the driven member under normal conditions, the employment of the same mechanism for both sending and receiving functions is facilitated. Thus in the printing telegraph example, the same rotary distributor may be used for both sending and receiving functions, and likewise the same rotary drum in the facsimile example may be used both in sending or receiving.

While the methods described herein, and the forms of apparatus for carrying these methods into effect, constitute preferred embodiments of the invention, it is to be understood that the invention is not limited to these precise methods and forms of apparatus, and that changes may be made in either without departing from the scope of the invention which is defined in the appended claims.

Whas is claimed is:

1. In a synchronizing system for remote control of rotary apparatus, in combination, rotary controlling means producing periodic electrical synchronizing impulses representative of a predetermined phase position of said rotary controlling means, transmission means for said impulses, receiving means responsive to said impulses, a controlled rotary member, drive means for rotating said controlled member substantially isochronously with respect to said controlling means, release means for said controlled member operable in response to said periodic impulses and adapted to establish approximate synchronism of said controlled member with said controlling means, and means responsive to said periodic impulses adapted to correct the phase of said controlled member thereby to establish unison of said controlled member with said controlling means.

2. In a sychronizing system for the remote control of apparatus, in combination, controlling means for producing periodic electrical synchronizing impulses, transmission means for said impulses, a controlled element, drive means for operating said controlled element through a cycle of operation in a period of time approximately corresponding to said periodic impulses, release means adapted to release said controlled element from a predetermined position thereby to establish substantial synchronism of said controlled element with said controlling means, and means intermediate said drive means and said controlled element controllable in response to said impulses and adapted to automatically establish and maintain unison of said controlled element with said controlling means.

3. In a synchronous system, the method of establishing and maintaining synchronism between remotely situated substantially isochronously rotating elements which comprises the steps of sending impulses indicative of a predetermined phase position of a controlling element; receiving said impulses; releasing a controlled element from a predetermined phase position in response to said received impulses thereby to establish substantial synchronism; adjusting the phase of said controlled element to establish unison; and thereafter correcting any predetermined accumulated phase difference between said controlled element and said controlling element responsively to said received impulses thereby to maintain synchronism.

4. In a synchronous system, the method of automatically establishing and maintaining synchronism between remotely situated rotating elements which comprises the steps of sending synchronizing impulses indicative of a predetermined phase position of a controlling element, receiving said impulses, releasing a controlled element from a predetermined phase position in response to said received impulses thereby to establish partial synchronism, advancing the phase position of said controlled element until unison is established, and thereafter advancing or retarding the phase position of said controlled member responsively to said synchronizing impulses as required to maintain unison.

HARRY J. NICHOLS.